(12) United States Patent
Kronenberg et al.

(10) Patent No.: US 7,105,831 B1
(45) Date of Patent: Sep. 12, 2006

(54) AMBIENT AIR ALPHA PARTICLES IONIZATION DETECTOR

(75) Inventors: Stanley Kronenberg, deceased, late of Skillman, NJ (US); by Eva Maria Kronenberg, legal representative, Skillman, NJ (US); George J. Brucker, Shrewsbury, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 335 days.

(21) Appl. No.: 10/410,449

(22) Filed: Apr. 9, 2003

(51) Int. Cl.
*H01J 47/02* (2006.01)
(52) U.S. Cl. .................................................. 250/382
(58) Field of Classification Search ................ 250/374, 250/382
See application file for complete search history.

(56) References Cited

U.S. PATENT DOCUMENTS

| | | | |
|---|---|---|---|
| 4,053,776 A * | 10/1977 | Hertzberg et al. | 250/382 |
| 4,859,854 A * | 8/1989 | Kershner et al. | 250/374 |
| 5,663,567 A * | 9/1997 | Steadman et al. | 250/382 |
| 6,037,595 A * | 3/2000 | Lingren | 250/370.01 |
| 6,333,504 B1 * | 12/2001 | Lingren et al. | 250/370.01 |
| 6,414,318 B1 * | 7/2002 | Uber et al. | 250/389 |
| 6,732,059 B1 * | 5/2004 | Warburton et al. | 702/78 |

* cited by examiner

*Primary Examiner*—Otilia Gabor
(74) *Attorney, Agent, or Firm*—Michael Zelenka; George B. Tereschuk

(57) ABSTRACT

An ionized alpha particle detector to directly measure alpha activity in ambient air that counts alpha pulses instead of measuring radon concentration is provided by an open-air ionization chamber, a means for collecting ions, a voltage source, a charging means and a means for recording alpha pulses. The ionized alpha particle detector allows the user to directly measure the alpha particle activity in ambient air and consequently, better assess the radiological public health risk from alpha particles emitted by inhaled air. The ionized alpha particle detector advantageously overcomes the difficulties in measuring alpha particles caused by oxygen ions that quickly attract electrons and form negative ions that compensate positive charged particles and prevent the formation of alpha particle pulses. The open-air ionization chamber of the ionized alpha particle detector prevents and overcomes the problems, shortcomings, drawbacks and limitations caused by oxygen ions by generating alpha pulses that can be readily detected. The present invention also provides an ionized alpha particle detector system and a method for detecting ionized alpha particles to directly measure alpha activity in ambient air.

19 Claims, 4 Drawing Sheets ns and limitations of prior art devices.

AMBIENT AIR ALPHA PARTICLES IONIZATION DETECTOR

GOVERNMENT INTEREST

The invention described herein may be manufactured, used, imported, sold, and licensed by or for the Government of the United States of America without the payment to us of any royalty thereon.

FIELD OF INTEREST

The invention relates to radiation sensors and, more particularly, to an ionization chamber for measuring alpha particles in ambient air by counting alpha pulses.

BACKGROUND OF THE INVENTION

It would often be extremely useful to quickly, accurately and inexpensively monitor energetic alpha particles found in ambient air. Monitoring airborne energetic alpha particles would be extremely useful because air containing alpha particles is considered to be unhealthy and a possible cause of lung cancer. While making such measurements is highly desirable and very useful, those skilled in the art realize that this is a difficult task to accomplish because of the properties of oxygen in air. Air contains oxygen, which is an electron positive gas that allows oxygen ions to quickly attract electrons to become negative ions.

Public health officials, the Environmental Protection Agency and related federal and state agencies believe that adverse health effects, including lung cancer, can be induced from the inhaling air containing contamination-emitting alpha particles. Based on this widespread belief, a direct measurement of alpha activity in the ambient air is the best approach of assessing the threat to the general public. Up until now, the general approach for assessing this serious health risk has been to measure the Radon content in air instead of the number of alpha particles in units of disintegrations per minute per liter ($dpm^{-1}$) of air. Measuring alpha particles in dpm $l^{-1}$ of air is a much more important and meaningful parameter because the potential energy deposited in lung tissue can be determined from this measurement. The current commercial radon measurement technique is to collect radon in a charcoal filter that is sent to a laboratory where the gamma ray emission is counted and correlated with the equivalent number of picoCuries per liter ($pCi\ l^{-1}$) of alpha particles in ambient air. Another procedure is to use a gamma ray counter to measure radon activity directly at the site. Such commercial procedures require placing a charcoal canister within a home or commercial building for a week, then sending the sample to a laboratory for testing and waiting for the test results. This technique suffers from a number of serious drawbacks and is considered inadequate. One significant disadvantage with this approach is that radon concentration is only proportional to potentially harmful alpha emitters in those cases where secular equilibrium of radon with its daughter products exists, or is at least a fixed fraction. In practice, this is never the case, because this equilibrium varies between 10% and 90% depending on location and time. Directly measuring the radon activity on site is a better approach but it still has the same disadvantage. Other shortcomings with the current radon concentration approach are that other natural sources of alpha particle activity such as Thorium and Uranium are not included in the radon measurements and none of the commercial measurements procedures are made in real time.

Thus there has been a long-felt need for a timely, accurate and inexpensive way to monitor energetic alpha particles found in ambient air. This invention provides a device to directly measure the alpha activity in ambient air with an open air ionization chamber that counts alpha pulses, and will fulfill the long-felt need for a timely, accurate and inexpensive way to monitor energetic alpha particles found in ambient air and improve the assessment of the serious public health risk, without suffering from any of the disadvantages, shortcomings and limitations of prior art devices.

SUMMARY OF THE INVENTION

It is an object of the present invention to provide an ambient air alpha particle ionization detector that measures alpha particles in ambient air.

It is another object of the present invention to provide an ambient air ionization chamber that measures alpha particles in ambient air by counting alpha pulses.

It is still another object of the present invention to provide an ambient air ionization chamber that includes an open-air ionization chamber and measures alpha particles in ambient air by counting alpha pulses.

These and other objects and advantages can now attained by this invention's ionized alpha particle detector to directly measure alpha activity in ambient air. Measuring individual, energetic alpha particles in ambient air is a difficult process because air contains oxygen, which is an electron positive gas. That is, oxygen ions quickly attract electrons to become negative ions and these ions compensate positive charged particles that prevent the formation of alpha particle pulses. In order to overcome this problem, the present invention provides an ionized alpha particle detector that counts alpha pulses, comprising an open-air ionization chamber, a means for collecting ions, a voltage source, a charging means and a means for recording alpha pulses. Up until now, those skilled in the art believed that an ionization chamber could not measure individual alpha pulses in ambient air because of the behavior of oxygen ions that prevented forming alpha pulses. However, this invention's ionized alpha particle detector has solved that problem by providing an open-air ionization chamber that allows the user to directly measure the alpha particle activity in ambient air and consequently, better asses the radiological public health risk from alpha particles emitted by inhaled air, without suffering from any of the disadvantages, shortcomings and limitations of prior art measurement devices.

DETAILED DESCRIPTION OF THE DRAWINGS

This invention's ionized alpha particle detector invention counts alpha pulses instead of measuring radon concentration. The ambient air alpha particle ionization detector of the present invention, comprises an open-air ionization chamber, a means for collecting ions, a voltage source, a means for charging and a means for recording alpha pulses to advantageously overcome the difficulties in measuring alpha particles caused by oxygen ions that quickly attract electrons to become negative ions compensating positive charged particles and preventing the formation of alpha particle pulses. This invention's ionization chamber prevents and overcomes those problems, shortcomings, drawbacks and limitations by generating alpha pulses that can be readily detected.

Figure 1:
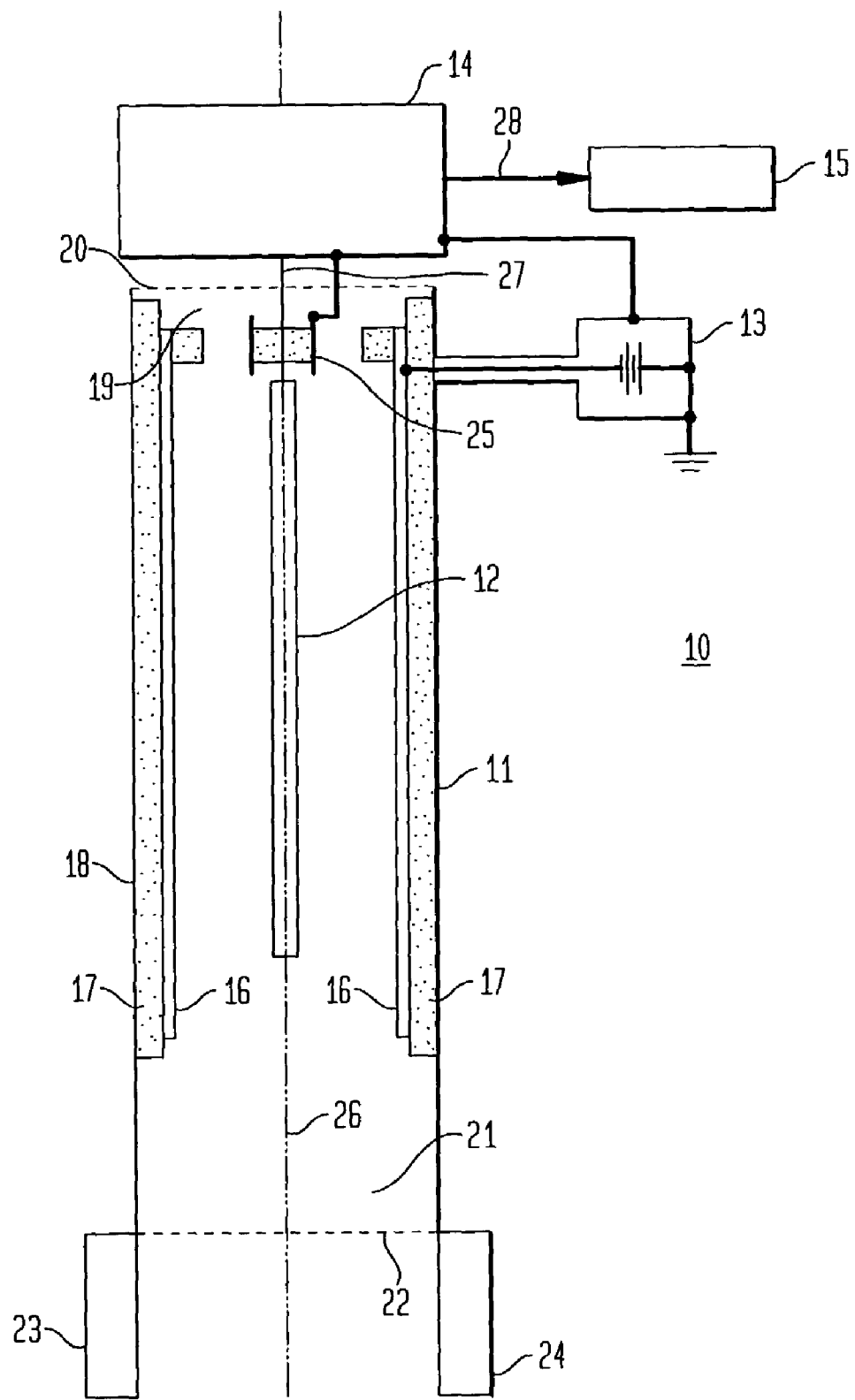
FIG. 1 is a cross-sectional view of the ambient air alpha particle ionization detector of the present invention.

Referring now to FIG. 1, which is a cross-sectional view of the ionized alpha particle detector 10, which comprises an open-air ionization chamber 11, a means for collecting ions 12, a voltage source 13, a charging means 14 and an alpha pulse recording means, indicated by box 15. The chamber 11 is a cylinder further comprising an interior wall 16, an insulation layer 17 and an outer RF shield 18, with the insulation layer 17 sandwiched between the interior wall 16 and outer RF shield 18. The chamber 11 also includes a top aperture 19, a top screen 20 to enclose the top aperture 19, a bottom aperture 21, a bottom screen 22 to enclose the bottom aperture and supports 23 and 24 that afford a sufficient opening for air to freely enter, and circulate within, chamber 11. The ion collection means 12 is placed along the cylindrical axis, indicated by imaginary broken line 26 and is grounded to the charging means 14, which, in turn, is connected to the voltage source 13. The interior wall 16, which is composed of metal, is connected to voltage source 13. A guard ring 25 is positioned in proximity to the top aperture 19 and is also connected to the charging means 14, which can be shielded. The charging means 14 provides an alpha pulse count output 28 to the alpha pulse recording means 15.

Figure 2:
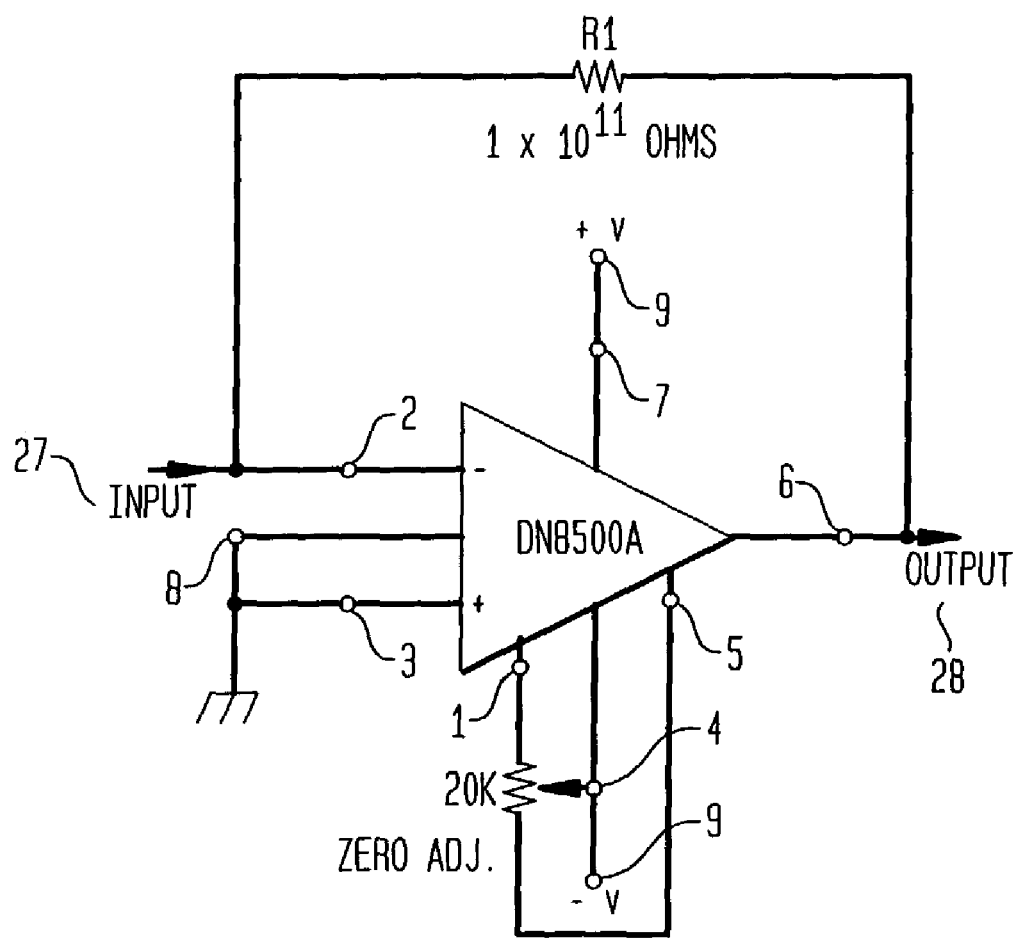
FIG. 2 is a circuit diagram depicting the means for collecting ions in accordance with the ambient air alpha particle ionization detector of the present invention.

FIG. 2 is a circuit diagram of one embodiment of the charging means 14 in accordance with the present invention. Referring now to FIG. 2, the charging means 14 receives an ion collection input signal 27 from the ion collection means 12, processes the ion collection input signal 27 and provides the alpha pulse count output 28 to the alpha pulse recording means 15.

In operation, referring now back to FIG. 1, the ion collection means 12 is connected to the ground through the charging means 14, which in turn, is connected to the voltage source 13 and the interior wall 16, and provides a negative voltage of 100 volts. Ambient air enters the open-air ionization chamber 11 through the top aperture 19 and bottom aperture 21. Alpha particles within the ambient air are ionized by the charging means 14, resulting in electrical charges that are collected by ion collection means 12, causing the ion collection means 12 to generate the ion collection input signal 27. The amount of electrical charges created by the charging means 14 is directly proportional to the intensity of the alpha particles in the ambient air. The alpha particles in the ambient air, the charging means 14, the ion collection means 12 and the alpha pulse recording means 15 interact so that the charging means 14 provides an alpha pulse count output 28 to the alpha pulse recording means 15, which can be a strip-chart-recorder that records the alpha particle pulses as a function of time to yield the number of alpha particles versus time.

Figure 3:
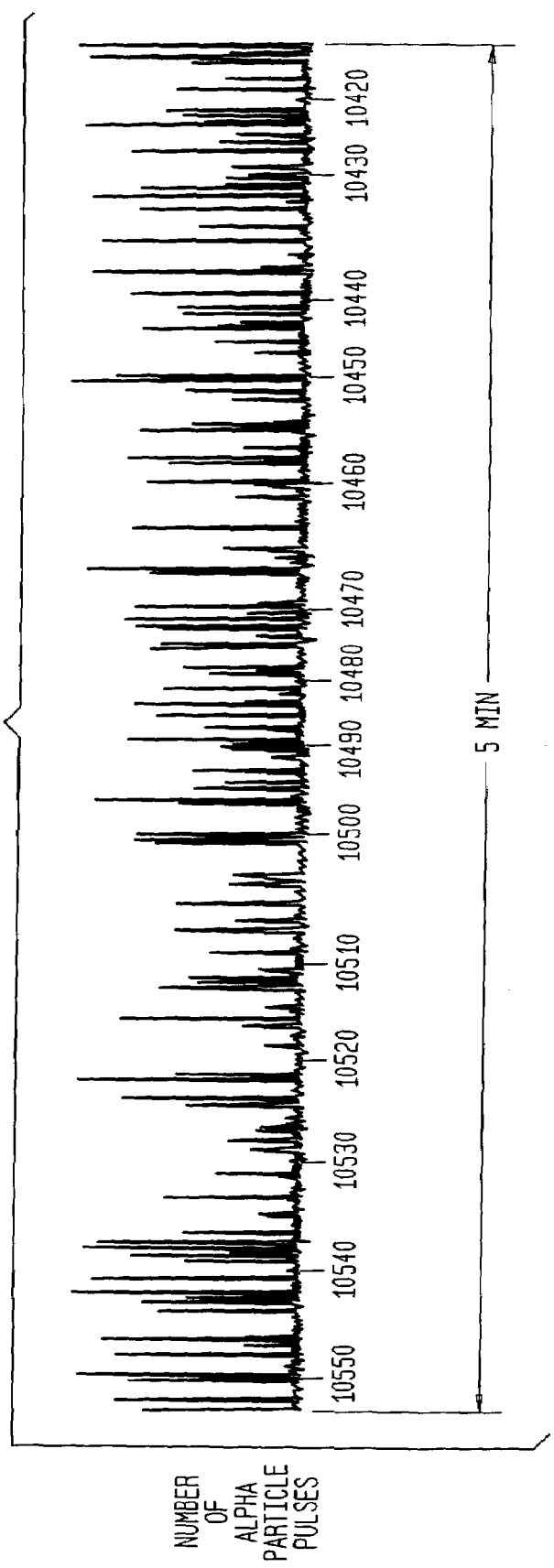
FIG. 3 is a portion of an experimental strip-chart-recording for five (5) minutes.

FIG. 3 is a portion of a strip-chart-recording for a five-minute time period when a strip-chart-recorder was used as the alpha pulse recording means 15 to take measurements in the basement of a private home. The FIG. 3 chart depicts approximately 130 alpha particle pulses that occurred during that period.

Figure 4:
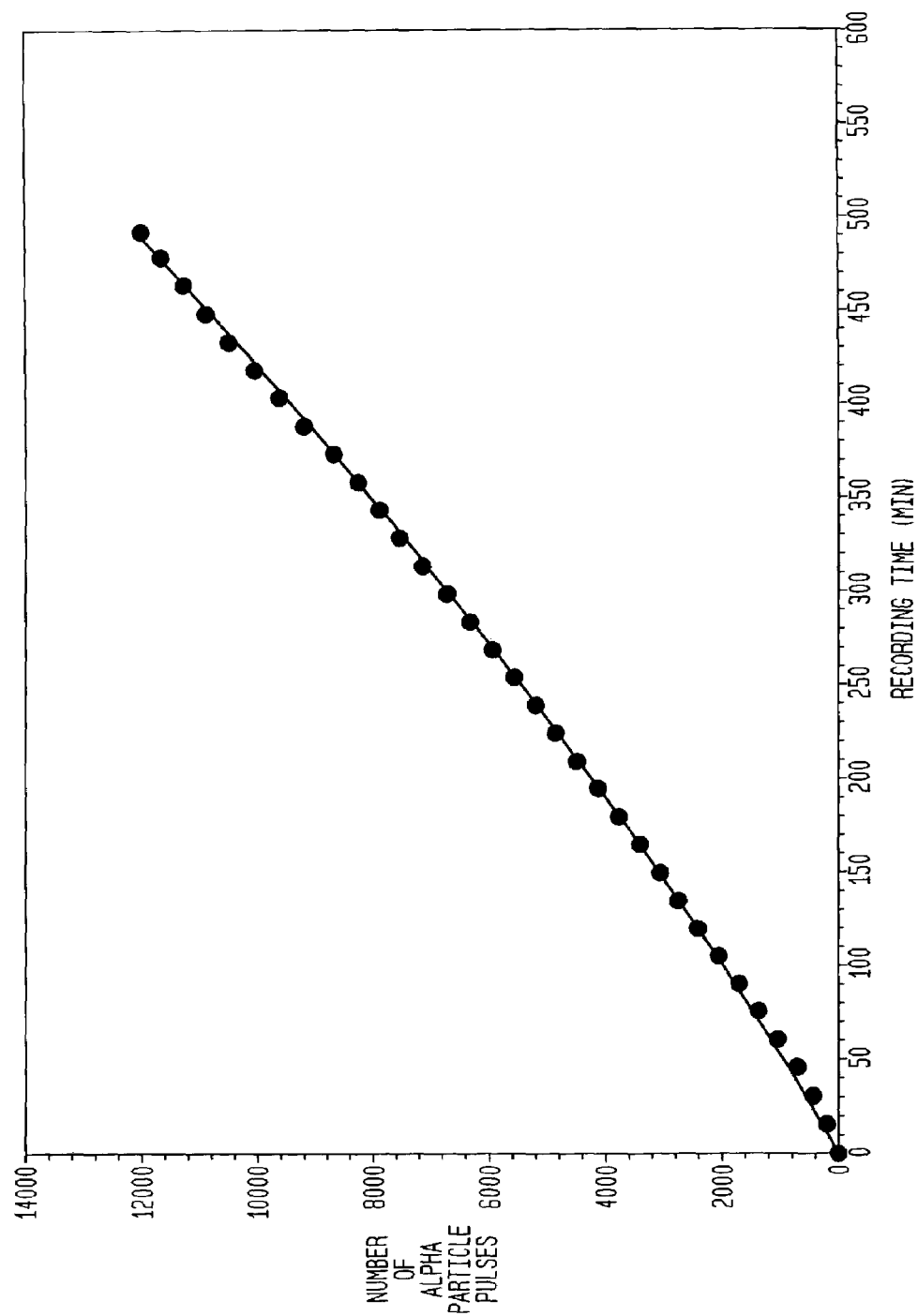
FIG. 4 is a plot of alpha pulses versus time measured during 493 minutes of experimental time in accordance with the present invention.

FIG. 4 is a plot of alpha pulses versus time measured during 493 minutes of experimental time in accordance with the present invention. This plot indicates 11,910 alpha pulses for 493 minutes, or a rate of 24 dpm per 0.5 liters of ambient air.

A number of variations of the present invention are possible. For example, the charging means 14 can be configured differently so long as an alpha count output 28 is provided to the recording means 15, the charging means 14 can be shielded, the ion collection means 12 can be a collecting electrode and the insulation layer 17 can be composed of any suitable insulating material, such as Lucite. The chamber 11 can be configured to hold an active volume of 0.5 liters of ambient air. The top screen 20 and bottom screen 22 can be wire screens.

Referring back to FIGS. 1 and 2, the present invention also contemplates a method for detecting ionized alpha particles to directly measure alpha activity in ambient air, comprising the steps of forming an open-air ionization chamber 11, providing the ionization chamber 11 in a cylindrical shape with a cylindrical axis 26, a metal interior wall 16 and an outer RF shield 18, inserting an insulation layer 17 between the interior wall 16 and the outer RF shield 18 and configuring the ionization chamber 11 with a top aperture 19 and a bottom aperture 21 to permit ambient air to enter the ionization chamber 11, the ambient air including oxygen ions and alpha particles. The method further comprises the steps of connecting the charging means 14 to a voltage source 13 and the interior wall 16 to the voltage source 13, disposing the ion collection means 12 along the cylindrical axis 26, grounding the ion collection means 12 to the charging means 14, shielding the charging means 14, creating an electrical field in proximity of the charging means 14 and the ion collection means 12, ionizing the alpha particles with the charging means, preventing the oxygen ions from attracting electrons away from the alpha particles and creating a plurality of unwanted negative ions, preserving the alpha particles ionized by said charging means, generating a plurality of alpha pulses from the ambient air within the ionization chamber 11 by preventing the formation of a plurality of negative ions to compensate positive charged particles, attracting the plurality of alpha pulses to the ion collection means 12, connecting a guard ring 25 to the charging means 14 in proximity to the top aperture 19, sending an ion collection input signal 27 from the ion collection means 12 to the charging means, processing the signal 27 in the charging means 14, sending an alpha particle pulse count output 28 from the charging means to a means for alpha pulse recording 15 to indicate a level of alpha particle activity in the ambient air the alpha particle pulse count output being directly proportional to a level of alpha particle intensity in the ambient air, providing the alpha particle pulse count output in units of disintegrations per minute per liter ($dpm^{-1}$) of air, allowing measurement of potential energy deposited in a subject's lung tissue, enclosing the top aperture with a top screen, enclosing the bottom aperture with a bottom screen; and forming a group of supports for the ionization chamber to permit the ambient air to freely enter, and circulate within, said ionization chamber.

The variations to the apparatus embodiments of the present invention also apply to the methods of the present invention.

It is to be understood that such other features and modifications to the foregoing detailed description are within the contemplation of the invention, which is not limited by this description. As will be further appreciated by those skilled in the art, any number of configurations, as well any number of combinations of circuits and differing materials and dimensions can achieve the results described herein. Accordingly, the present invention should not be limited by the foregoing description, but only by the appended claims.

We claim:

1. An ionized alpha particle detector for direct measurement of alpha activity in ambient air, comprising:
    a cylindrical open-air ionization chamber;
    a means for collecting ions is positioned within said ionization chamber;
    a means for charging is connected to a voltage source;
    said ionization chamber, having a cylindrical axis, a metal interior wall connected to said voltage source, an insulation layer, a plurality of apertures and an outer RF shield, permits said ambient air to circulate freely within said ionization chamber, said ambient air including a plurality of oxygen ions and a plurality of alpha particles;
    said charging means and said ion collection means create an electrical field;
    said charging means ionizes said plurality of alpha particles and said electrical field prevents said plurality of oxygen ions from attracting electrons away from said plurality of alpha particles and creating a plurality of unwanted negative ions;
    said charging means, having ionized said plurality of alpha particles, preserves said plurality of alpha particles and generates a plurality of alpha pulses;
    said ion collection means attracts said plurality of alpha pulses and sends an ion collection signal input to said charging means; and
    said charging means provides an alpha particle pulse count output to a means for recording alpha pulses, said alpha particle pulse count output, being directly proportional to a level of alpha particle intensity in said ambient air, is provided in units of disintegrations per minute per liter ($dpm^{-1}$) of air, allowing measurement of potential energy deposited in a subject's lung tissue.

2. The ionized alpha particle detector for direct measurement of alpha activity in ambient air, as recited in claim 1, further comprising said ion collection means being disposed along said cylindrical axis.

3. The ionized alpha particle detector for direct measurement of alpha activity in ambient air, as recited in claim 2, further comprising said insulation layer being disposed between said interior wall and said outer RF shield.

4. The ionized alpha particle detector for direct measurement of alpha activity in ambient air, as recited in claim 3, further comprising:
    said ionization chamber having a top aperture and a bottom aperture.

5. The ionized alpha particle detector for direct measurement of alpha activity in ambient air, as recited in claim 4, further comprising a guard ring being positioned in proximity to said top aperture and connected to said charging means.

6. The ionized alpha particle detector for direct measurement of alpha activity in ambient air, as recited in claim 5, further comprising said charging means being shielded.

7. The ionized alpha particle detector for direct measurement of alpha activity in ambient air, as recited in claim 6, further comprising said ion collection means having at least one electrode.

8. The ionized alpha particle detector for direct measurement of alpha activity in ambient air, as recited in claim 7, further comprising said at least one electrode being a collection electrode.

9. The ionized alpha particle detector for direct measurement of alpha activity in ambient air, as recited in claim 8, further comprising said insulation layer being composed of Lucite.

10. An ionized alpha particle detector system for directly measuring alpha activity in ambient air, comprising:
    a cylindrical open-air ionization chamber;
    said ionization chamber, having a cylindrical axis, a metal interior wall connected to a voltage source, an insulation layer placed between said interior wall and an outer RF shield, a top aperture, a bottom aperture and a plurality of supports, being configured to permit said ambient air to enter, and circulate freely within, said ionization chamber;
    said ambient air including a plurality of oxygen ions and a plurality of alpha particles;
    a means for charging is connected to said voltage source;
    a means for collecting ions is disposed along said cylindrical axis and is grounded to said charging means;
    said charging means and said ion collection means create an electrical field;
    said charging means ionizes said plurality of alpha particles and said electrical field prevents said plurality of oxygen ions from attracting electrons away from said plurality of alpha particles and creating a plurality of unwanted negative ions to compensate positive charged particles;
    said charging means, having ionized said plurality of alpha particles, preserves said plurality of alpha particles and generates a plurality of alpha pulses;
    said ion collection means attracts said plurality of alpha pulses and sends an ion collection signal input to said charging means;
    a guard ring is positioned in proximity to said top aperture and is connected to said charging means;
    said top aperture being enclosed by a top screen and said bottom aperture being enclosed by a bottom screen;
    said charging means being shielded; and
    said charging means provides an alpha particle pulse count output to a means for recording alpha pulses, said alpha particle pulse count output, being directly proportional to a level of alpha particle intensity in said ambient air, is provided in units of disintegrations per minute per liter ($dpm^{-1}$) of air, allowing measurement of potential energy deposited in a subject's lung tissue, said alpha pulse recording means being a strip-chart-recorder that records said alpha particle pulse count output as a function of time.

11. The ionized alpha particle detector system for directly measuring alpha activity in ambient air, as recited in claim 10, further comprising said ion collection means having at least one electrode.

12. The ionized alpha particle detector system for directly measuring alpha activity in ambient air, as recited in claim 11, further comprising said at least one electrode being a collection electrode.

13. The ionized alpha particle detector system for directly measuring alpha activity in ambient air, as recited in claim 12, further comprising said insulation layer being composed of Lucite.

14. A method for detecting ionized alpha particles to directly measure alpha activity in ambient air, comprising the steps of:
    forming an open-air ionization chamber;
    providing said ionization chamber in a cylindrical shape, said ionization chamber having a cylindrical axis, a metal interior wall and an outer RF shield;

inserting an insulation layer between said interior wall and said outer RF shield;

configuring said ionization chamber with a top aperture and a bottom aperture, said ionization chamber permitting ambient air to circulate freely within said ionization chamber, said ambient air including a plurality of oxygen ions and a plurality of alpha particles;

connecting said interior wall to a voltage source;

connecting a means for charging to said voltage source;

disposing a means for collecting ions along said cylindrical axis;

grounding said ion collection means to said charging means;

shielding said charging means;

creating an electrical field in proximity to said charging means and said ion collection means;

ionizing said plurality of alpha particles with said charging means;

preventing said plurality of oxygen ions from attracting electrons away from said plurality of alpha particles and creating a plurality of unwanted negative ions;

preserving said plurality of alpha particles ionized by said charging means;

generating a plurality of alpha pulses within said ionization chamber;

attracting said plurality of alpha pulses to said ion collection means;

connecting a guard ring to said charging means in proximity to said top aperture;

sending an ion collection signal input from said ion collection means to said charging means;

sending an alpha particle pulse count output from said charging means to a means for recording alpha pulses to indicate a level of alpha particle activity in said ambient air, said alpha particle pulse count output being directly proportional to a level of alpha particle intensity in said ambient air;

providing said alpha particle pulse count output in units of disintegrations per minute per liter ($dpm^{-1}$) of air, allowing measurement of potential energy deposited in a subject's lung tissue;

enclosing said top aperture with a top screen;

enclosing said bottom aperture with a bottom screen; and forming a group of supports for said ionization chamber to permit said ambient air to freely enter, and circulate within, said ionization chamber.

15. The method for detecting ionized alpha particles to directly measure alpha activity in ambient air, as recited in claim 14, further comprising the step of forming said interior wall in a cylindrical shape.

16. The method for detecting ionized alpha particles to directly measure alpha activity in ambient air, as recited in claim 15, wherein said alpha pulse recording means is a strip-chart-recorder that records said alpha particle pulses as a function of time.

17. The method for detecting ionized alpha particles to directly measure alpha activity in ambient air, as recited in claim 16, further comprising the step of forming said ion collection means with at least one electrode.

18. The method for detecting ionized alpha particles to directly measure alpha activity in ambient air, as recited in claim 17, wherein said at least one electrode is a collection electrode.

19. The method for detecting ionized alpha particles to directly measure alpha activity in ambient air, as recited in claim 18, further comprising the step of forming said insulation layer from Lucite.

* * * * *